Figure 1:
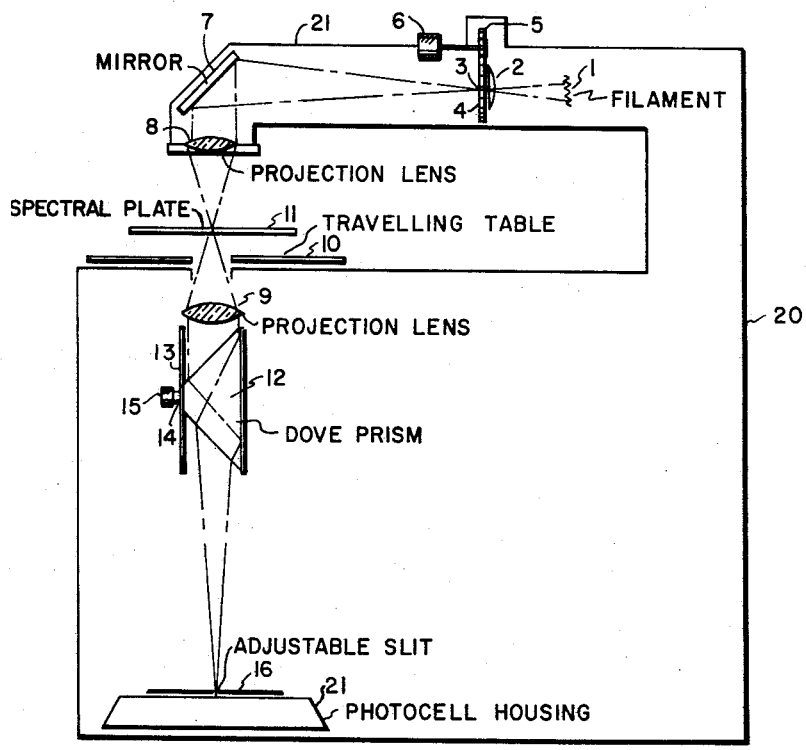

Dec. 12, 1961 A. F. WIEBE 3,012,466
MICRODENSITOMETER
Filed Nov. 7, 1960

INVENTOR.
ALWYN F. WIEBE
BY
ATTORNEY

United States Patent Office 3,012,466
Patented Dec. 12, 1961

3,012,466
MICRODENSITOMETER
Alwyn F. Wiebe, Stamford, Conn., assignor to Barnes Engineering Company, Stamford, Conn., a corporation of Delaware
Filed Nov. 7, 1960, Ser. No. 67,716
3 Claims. (Cl. 88—14)

This invention relates to an improved instrument for reading the optical transmission of narrow lines.

The most common instrument presenting this problem is a microdensitometer which is extensively used for the quantitative measurement of optical density of lines on a photographic spectrum. Essentially these instruments provide a movable framework or traveling table in which a photographic plate from a spectrograph is mounted. A source of light and slit with suitable lenses projects a narrow line of light through the spectral lines on the plate onto a second slit. Back of this slit there is a radiation detector such as a photocell or phototube. A stringent requirement of the instrument is precise alignment of the spectral lines and the two slits. All of the energy from the narrow beam after going through the spectral plate must pass through the second slit in order to get an accurate measurement. Theoretically it is a simple matter when the spectral lines are parallel perpendicular to the direction of spectral dispersion. However, problems arise when the lines are not perpendicular. The ordinary microdensitometer provides only for a very slight adjustment of the second slit and travelling table which is inadequate if the spectral lines are more than about a degree out of a parallel orientation to the slit. Instances where bands of spectral lines are not perpendicular to direction of dispersion occur, for example, when the reentry of a rocket nose cone and associated pieces are observed by a ballistic camera with a spectrograph attachment.

In the ballistic camera spectra frequently occur which have the spectral lines oriented diagonally to the direction of dispersion. Such a plate cannot be read in the ordinary microdensitometer unless it is mounted in the traveling table at an angle which is not feasible for accurate work.

The present invention interposes in the light path between the plane of the spectral plates and the second slit an optical rotating device which rotates the beam without otherwise affecting it. Typical of such a device is a Dove prism mounted in a sleeve which can be rotated. In this manner a spectral line on the plate which is not correctly oriented can be rotated about the optical axis so that it coincides exactly with the second slit. The invention also involves a precise device for rotating the first slit because, of course, it is necessary that the narrow line of light also be suitably oriented. This is easily done by mounting the first slit in a sleeve which is turned through accurate gearing.

It is an advantage of the present invention that the adjustments are simple, precise and that they can be made while the instrument is in operation. For example, it is possible to read a series of lines in which the orientation of each line changes. Also the present invention performs both functions of reading lines at different angles and of maintaining at all times a precise alignment of the two slits.

Another advantage of the present invention is that it operates without in any way affecting adversely the provisions for accurate focusing which are essential in the instrument for the first slit has to be accurately imaged on the plane of the spectral plate and the beam passing therethrough equally accurately imaged onto the second slit.

The rotation of the beam from the spectral plate and of the first slit may be affected manually through precision drives with negligible backlash. For most instruments manual operation of these two separate controls is all that is required because in most instances any particular spectral band will have its lines parallel to each other at least for most of its extent. Thus it is only necessary to set the orientation of the first slit and the rotation of the beam striking the second slit for the first line of the spectral band and it will remain in alignment as the traveling table moves readjusting from time to time. Where, however, such readjustments are repeatedly necessary the two drives can be geared together so that adjustment of either will automatically adjust the other. This presents a simple gearing problem for the two rotations are linearly related, the first slit having to be rotated at twice the rate of the Dove prism. In such a case only a single manual adjustment is necessary and the observer can maintain continuously the sharp line of light on one spectral line after another, the alignment with the second slit being automatically provided. It should be noted that this second slit is rigidly mounted and there is no possibility of its turning slightly in use which is the case when an adjustment is provided in the ordinary instrument. Interconnecting gearing between the two drives is conventional in design and therefore is not shown in the drawings.

Figure 2:
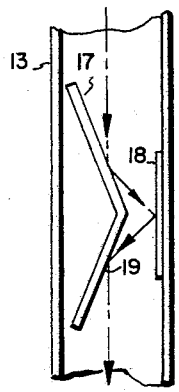

A Dove prism has been referred to as a means for rotating the projected beam which strikes the second slit. This optical element presents many advantages. It is extremely rugged and cannot get out of adjustment as its reflecting faces are rigidly oriented on the solid body of the prism. However, any other device which will rotate a beam of light without otherwise affecting it may be used, for example, three mirrors arranged as shown in FIG. 2. The triple mirror arrangement is less rugged but it is cheaper and it is completely achromatic thus permitting the use of different sources of light. For ordinary spectral plate readout this is of no significance because the plates are in black and white. However, since the instrument of the present invention is not limited to a microdensitometer and can be used in instruments where the measurement of lines in different colors may be important, the achromaticity of mirrors presents some advantage in such instruments. In general, however, most instruments are preferred with Dove prisms because of the greater ruggedness and compactness of the element.

The invention will be described in greater detail in conjunction with the drawings in which:

FIG. 1 is a diagrammatic vertical section, and
FIG. 2 is a detail view of a modified beam rotating element.

A microdensitometer is enclosed in a casing 20 with a projection arm 21. A source of light 1 passes through a condensing lens 2 and then through a slit 3 in a rotating mount 4 provided with gearing 5 actuated by a knob 6. The beam through the slit is turned by the mirror 7 and passes through the first projection lens 8 which images the slit 3 onto the plane of the spectral plate 11 which is carried by a traveling table 10. After passing through the plate the beam traverses a second projection lens 9 which is provided with a focusing mount. As this mount is a standard design it is not shown. The effect of the lens 9 is to image the slit 3 onto the plane of a second slit 16, the beam passing through a Dove prism 12 mounted in a sleeve 13 provided with a gearing 14 and a gear knob 15 the shaft of which projects out through the housing. After passing through the second slit 16 the beam strikes a photocell (not shown), in a housing 21 where the radiation is transformed into an electrical signal. This signal is used to actuate meters, recorders and the like but as these elements are conventional and are not different from that of an ordinary microdensitometer they are not shown.

When the band of spectral lines on the plate 11 are oriented in a particular pattern knobs 6 and 15, or if they are interconnected with 2 to 1 gearing (not shown), one of them, are turned until the first slit is imaged parallel to the spectral lines and the beam after passing through the Dove prism is accurately oriented on the slit 16. Any change in orientation of spectral lines can be immediately compensated by adjusting the controls.

When an ordinary spectral plate is examined in which the lines are in bands perpendicular to the direction of dispersion adjustment is made once and line after line is examined as the traveling table is moved. This operation is no different from that of an ordinary microdensitometer.

FIG. 2 shows an alternative beam rotating device in which three mirrors 17, 18 and 19 are arranged to replace the faces of the Dove prism. The rotation of the beam is effected in precisely the same manner and at the same rate.

Ideally both Dove prism and the mirrors of FIG. 2 should operate with a collimated light beam. However, the beam in the present invention departs from parallelism by so small an angle that no significant errors are introduced.

I claim:

1. An instrument for the precise measurement of transmission through narrow lines comprising in combination and in optical alignment mounting means for a plate containing the lines, a source of light, a slit, means for imaging the slit onto the plane of the plate, means for rotating the slit so as to produce images on the plate at various orientations, a second slit, a radiation detector behind said slit, projecting means for projecting the light beam passing through the plate onto the plane of said second slit and adjustable beam rotating means positioned in said beam.

2. An instrument according to claim 1 in which the beam rotating means is a Dove prism.

3. An instrument according to claim 1 in which the beam rotation means are a set of three mirrors.

References Cited in the file of this patent

UNITED STATES PATENTS

| | | |
|---|---|---|
| 2,563,892 | Waller et al. | Aug. 14, 1951 |
| 2,837,959 | Saunderson et al. | June 10, 1958 |